(12) United States Patent
Chaudeurge

(10) Patent No.: US 8,342,562 B2
(45) Date of Patent: Jan. 1, 2013

(54) STROLLER FRAME, PARTICULARLY FOR TRANSPORTING A CHILD

(76) Inventor: Jean-Michel Francois Chaudeurge, Tourves (FR)

( * ) Notice: Subject to any disclaimer, the term of this patent is extended or adjusted under 35 U.S.C. 154(b) by 184 days.

(21) Appl. No.: 12/812,941

(22) PCT Filed: Jan. 16, 2009

(86) PCT No.: PCT/FR2009/050059
§ 371 (c)(1),
(2), (4) Date: Sep. 9, 2010

(87) PCT Pub. No.: WO2009/092970
PCT Pub. Date: Jul. 30, 2009

(65) Prior Publication Data
US 2011/0006495 A1    Jan. 13, 2011

(30) Foreign Application Priority Data
Jan. 17, 2008   (FR) ...................... 08 50283

(51) Int. Cl.
*B62B 1/00* (2006.01)
(52) U.S. Cl. .................. 280/642; 280/650; 280/647
(58) Field of Classification Search ................ 280/650, 280/647, 642, 658, 639, 652, 64, 47.389
See application file for complete search history.

(56) References Cited

U.S. PATENT DOCUMENTS

| 4,953,880 | A  | * | 9/1990  | Sudakoff et al. | 280/47.38 |
|-----------|----|---|---------|-----------------|-----------|
| 5,558,357 | A  | * | 9/1996  | Wang            | 280/647   |
| 5,647,601 | A  |   | 7/1997  | Potter et al.   |           |
| 7,077,420 | B1 | * | 7/2006  | Santoski        | 280/642   |
| 7,591,479 | B2 | * | 9/2009  | Golias          | 280/647   |
| 7,832,756 | B2 | * | 11/2010 | Storm           | 280/642   |
| 2007/0090628 | A1 | * | 4/2007  | Golias       | 280/642   |
| 2007/0257471 | A1 | * | 11/2007 | Myers et al. | 280/642   |
| 2007/0290485 | A1 | * | 12/2007 | Nolan et al. | 280/642   |

FOREIGN PATENT DOCUMENTS

| DE | 20203348 U1 | 8/2002 |
|----|-------------|--------|
| WO | WO 03/097466 A | 11/2003 |

* cited by examiner

*Primary Examiner* — Hau Phan
(74) *Attorney, Agent, or Firm* — Dowell & Dowell, PC

(57) ABSTRACT

A frame for a child's stroller which includes two rear arms and a single front arm which are joined to one another with the two rear arms spaced on opposite sides of a front to rear median vertical plane (P) of the frame and wherein wheels are pivotally mounted to each of the arms so as to be movable between first deployed positions wherein an axes of rotation of the wheels extend transversely to the plane (P) and a second compact storage position wherein the axes of rotation of the wheels extend parallel with respect to the plane (P), and wherein the wheels connected so as to be moved simultaneously between the two positions.

20 Claims, 9 Drawing Sheets

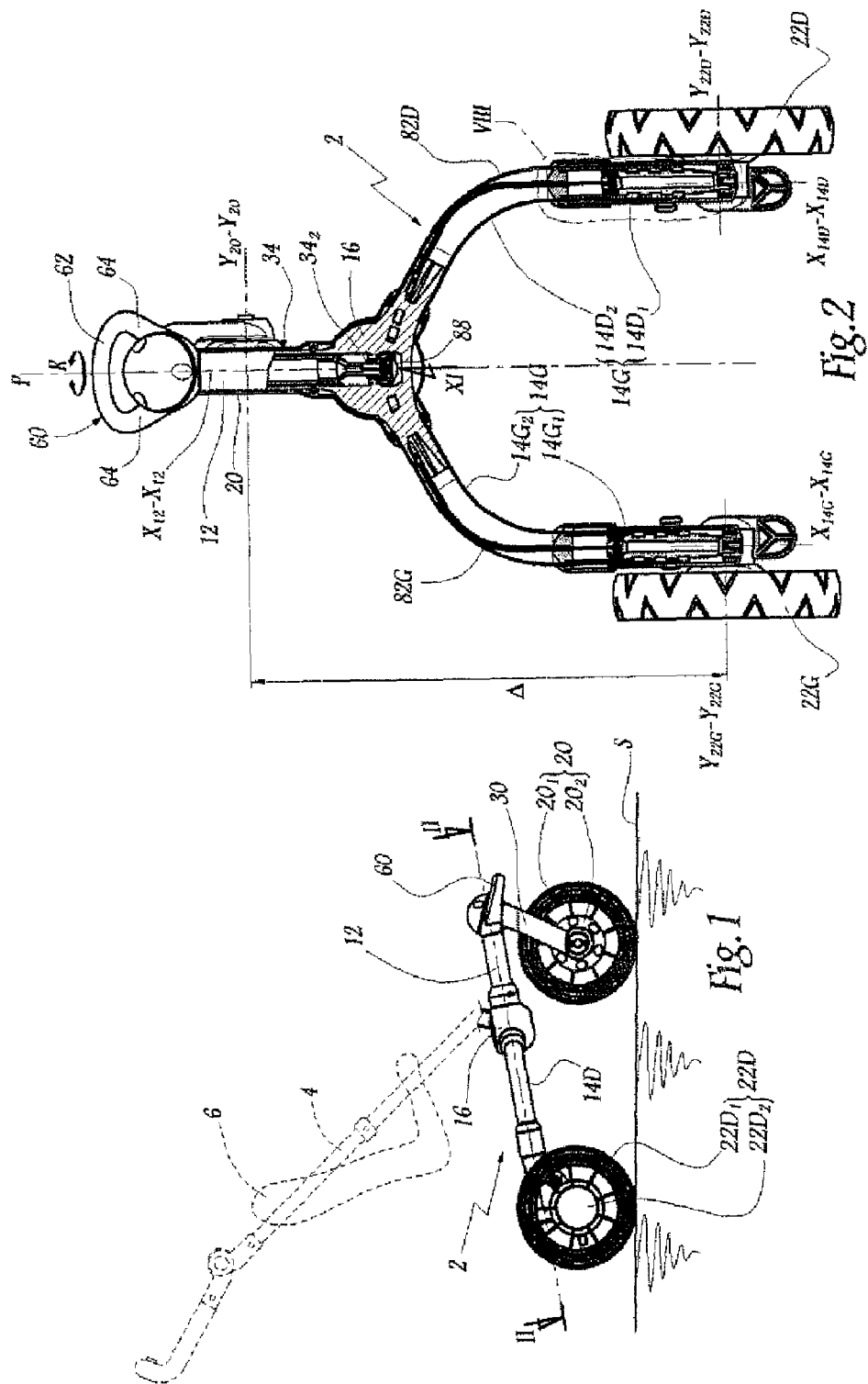

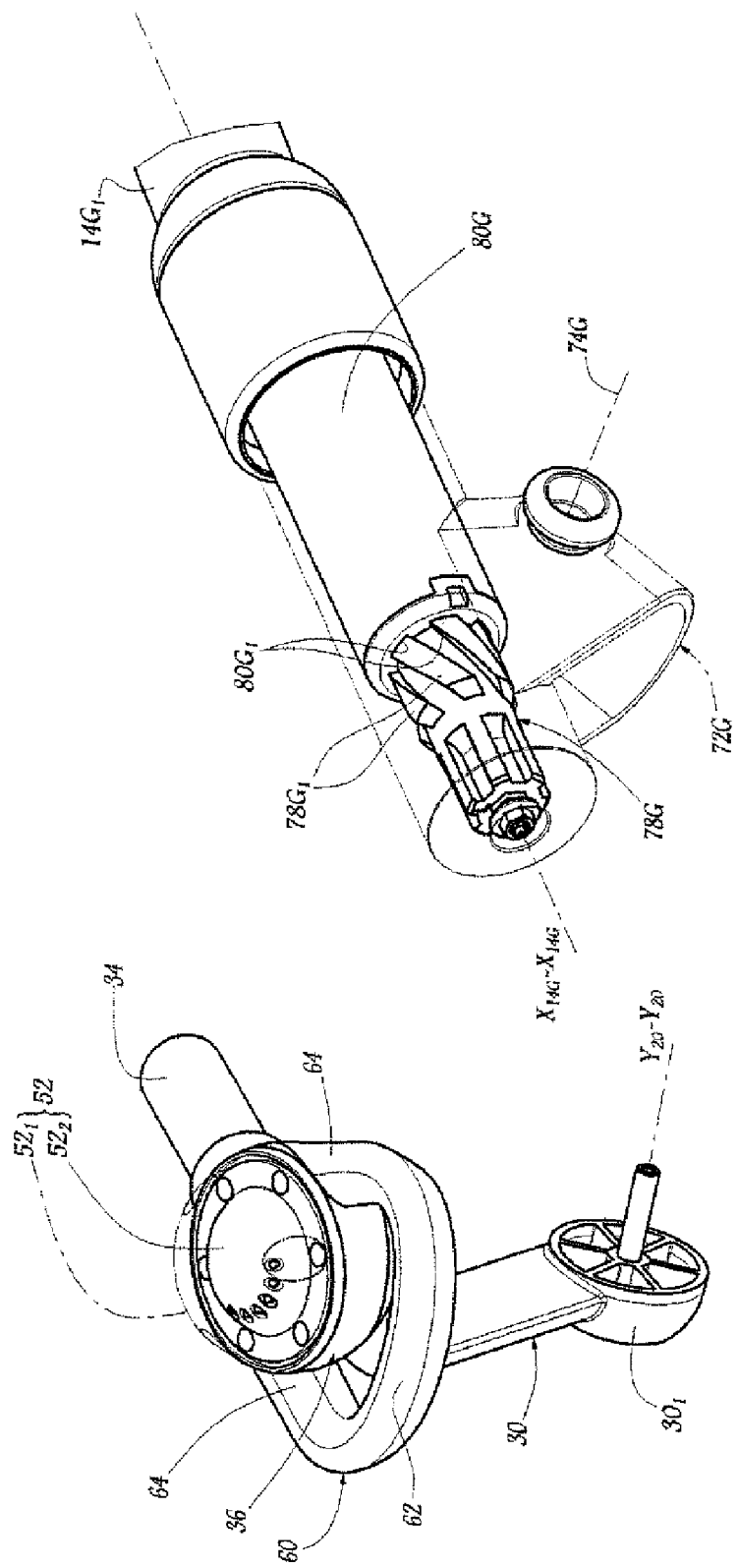

STROLLER FRAME, PARTICULARLY FOR TRANSPORTING A CHILD

BACKGROUND OF THE INVENTION

1. Field of the Invention

The present invention relates to a stroller frame. It relates in particular to the field of strollers for transporting a very young child.

2. Brief Description of the Related Art

To push a stroller on the ground, its frame is typically equipped with wheels or casters. The invention deals in particular with the so-called "three-wheel" stroller frames, that is to say, stroller frames provided, at the front, with a single wheel or a single pair of twinned wheels, whereas, at the rear of the frame, there are distinctly provided two wheels or two pairs of twinned wheels, respectively on the left and right sides of the frame. This type of stroller frame is highly appreciated because it gives the stroller a particularly pleasing overall appearance, with a sporty look, which is particularly attractive to a young clientele, as well as for the fact that having the frame press on the ground in three areas forming the vertices of a forward-pointing triangle makes the frame extremely easy to handle. This type of stroller frame is thus recognized for its good rolling behavior on country paths and bumpy ground, particularly in cities where strollers have to negotiate sidewalks, staircases, etc.

However, the existing three-wheel stroller frames have a major drawback associated with their bulk: this type of frame makes it essential, for comfort and safety reasons, to provide for the wheels to have a relatively large diameter. Given these conditions, some users forego the purchase of this type of stroller frame because it is so difficult to stow away and transport when the stroller is not in use, and to load in and unload from transport vehicles.

In the field of so-called conventional strollers, unlike the three-wheel strollers, that is to say, in the field of strollers with a "four-wheel" frame, frames are known that allow for the two front wheels and the two rear wheels to be retracted, particularly for the purposes of stowing away the stroller. For example, in the recent document WO-A-2007/025551, the front and rear wheels of one and the same left or right side of a stroller can be simultaneously moved, relative to the frame of the stroller, from an extended service position, in which the wheels are extended vertically to roll on the ground, to a retracted storage position, in which the wheels are extended horizontally to be flattened against the frame. Other examples of four-wheel stroller frames that are retractable in this way are provided by the older documents FR-A-525 797, U.S. Pat. No. 2,429,763 and U.S. Pat. No. 4,659,096.

In practice, the teaching relating to four-wheel stroller frames cannot, however, be transposed to a three-wheel stroller frame because of the specific structure of this frame essentially consisting of a single front arm and two rear arms, respectively left and right. Thus, WO-A-03/097466 proposes a stroller frame of which the three wheels can be moved from an extended service position to a retracted storage position, but only in a way that is both successive, that is to say one wheel after the other, and complicated, that is to say after several manual actions on the part of the user in several different areas of the stroller frame.

SUMMARY OF THE INVENTION

The aim of the present invention is to propose a "three-wheel" stroller frame of the type discussed hereinabove, of which all the wheels can be retracted quickly, simply and easily.

To this end, the subject of the invention is a stroller frame particularly for transporting a child, comprising:

two rear arms and a single front arm, which are fixedly joined to one another and respectively provided with at least one wheel bearing on the ground, means of moving the rear and front wheels relative to their respective arms, suitable for simultaneously moving all the wheels between, respectively, an extended service position, in which the rotation axes of all the wheels extend substantially perpendicularly to the same antero-posterior median plane of the frame, and a retracted storage position, in which the rotation axes of all the wheels extend substantially parallel to this plane, the antero-posterior distance between the rear wheels and the front wheel or wheels then being smaller than when the wheels are in their extended position, and a specific handle for manually driving the movement means, arranged at the front end of the front arm.

The idea on which the invention is based is to exploit the particular structure of the "three-wheel" stroller frame to provide the user with a practical control handle, that specifically makes it possible to retract all the wheels. By virtue of this handle, the user is able to easily and quickly apply a driving force that the movement means, incorporated in the frame, transmit mechanically, in the front region of the frame, to the front wheel or to the twinned front wheel train, and, in the rear region of the frame, to the two rear wheels or to the two twinned rear wheel trains, respectively left and right. This handle enables the user to preferentially apply a driving torque to the input of the movement means advantageously with one hand. The mechanical nature of the arms, of the movement means and of the handle makes the stroller frame robust and reliable, the relative movement between the wheels and the arms being precise, rapid and reproducible.

When the wheels are in their retracted storage position, the bulk of the frame is significantly reduced, both in the direction in which the bodies of the wheels and the frame are then arranged in superposed planes, and in the antero-posterior direction of the frame because of the convergence toward the front of the rear wheels.

By positioning the control handle at the front end of the frame, this handle can be grasped manually by the user, quickly and easily. This handle then forms, with respect to the user, a reference element with regard to the mechanical positioning of the moving components of the stroller: depending on the drive action that the user imposes on this handle, all the wheels of the stroller are retracted or extended at the same time, being respectively accompanied by a "shortening" or an "elongation" of the frame, that is to say a bringing-together or a distancing of the rear wheels relative to the front wheel, by virtue of the action of the movement means.

Furthermore, the front handle makes it possible, when the wheels are in their retracted storage position, to lift the frame from the ground, for example to load it in a car trunk, or to pull it on the ground. Moreover, according to an advantageous feature of the stroller frame according to the invention, when the wheels are in their retracted position, the rear wheels extend substantially in the same plane perpendicular to the antero-posterior median plane of the frame and are able to roll on the ground in this same plane. This way, when the wheels are retracted, the rear wheels are able to rest in line on the ground, which enables the stroller to be stabilized vertically, to be very easily pulled or pushed laterally by virtue of the handle which is then situated at the top of the frame, particularly for the purposes of stowage in a closet or similar, in the manner of a baggage trolley. In practice, the user can then control the retraction of the wheels so that the rear wheels remain pressed on the ground while they are being retracted, whereas it progressively straightens the frame vertically, with its front end directed upward. In this way, the retraction of the wheels automatically results in the frame being converted to a stable vertical stowage position.

Other advantageous features of the stroller frame according to the invention, taken in isolation or in all technically possible combinations, are specified in the dependent claims 2 to 15.

BRIEF DESCRIPTION OF THE DRAWINGS

The invention will be better understood on reading the following description, given solely as an example, and with reference to the drawings in which:

FIG. 1 is a diagrammatic view in side elevation of a stroller frame according to the invention, in a service configuration;

FIG. 2 is a partial cross section along the line II-II of FIG. 1;

FIG. 7 is a perspective view of the front end of the stroller frame;

FIG. 10 is a perspective view of the left rear end of the frame;

DESCRIPTION OF THE PREFERRED EMBODIMENTS

Figure 4:
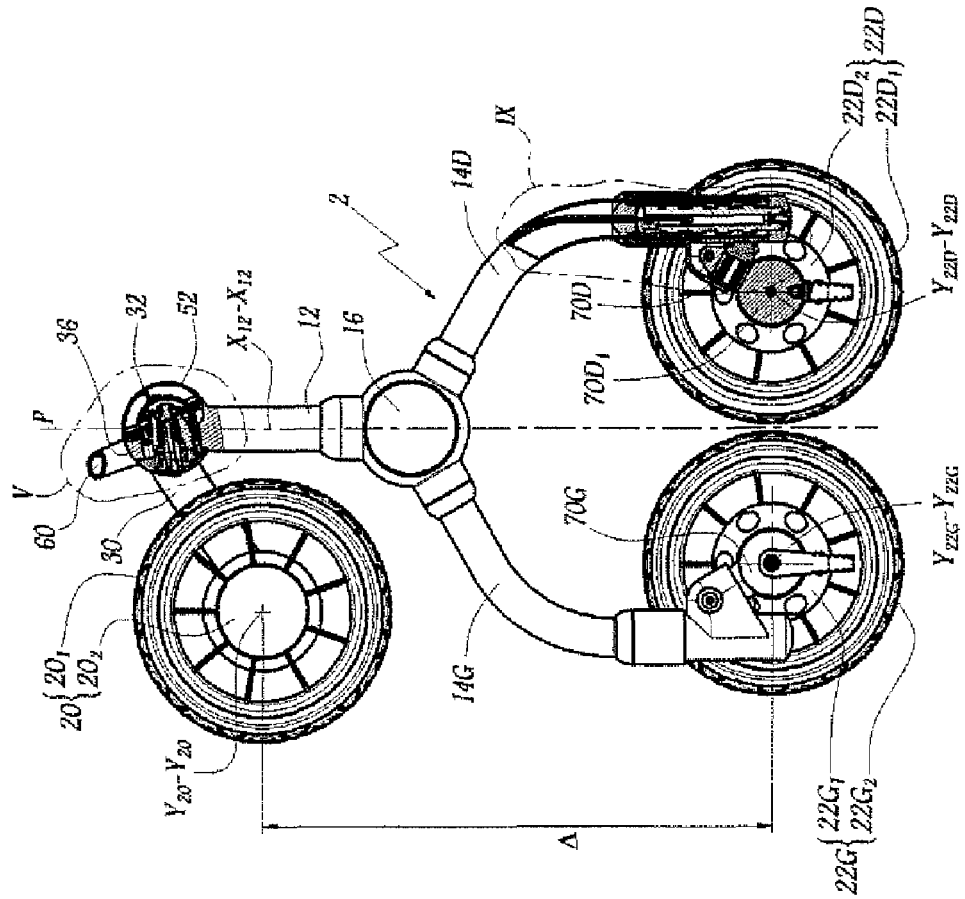
FIG. 4 is a partial cross section along the line IV-IV of FIG. 3.

The figures show a frame 2 of a stroller intended to transport a very young child, by being pushed on the ground S by an adult. As represented very diagrammatically in FIG. 1 only, this stroller comprises, in addition to the frame 2, a mounting 4 to which is, in this case, added and fixed a seat 6 in which the transported child is sat, it being noted that, in the interests of clarity of the drawing, the child is not shown. In a variant that is not represented, the seat 6 is replaced by a bed, making it possible to transport the child lying down, or by another similar transport element that is nonlimiting of the present invention. In practice, the mounting 4 can have extremely diverse structures, including or not including components that are articulated relative to one another, it being understood that each of these structures is supported by the frame 2 in an articulated and/or removable manner, in particular for the purposes of folding and/or storing the stroller in periods during which said stroller is not used to transport the child.

Figure 3:
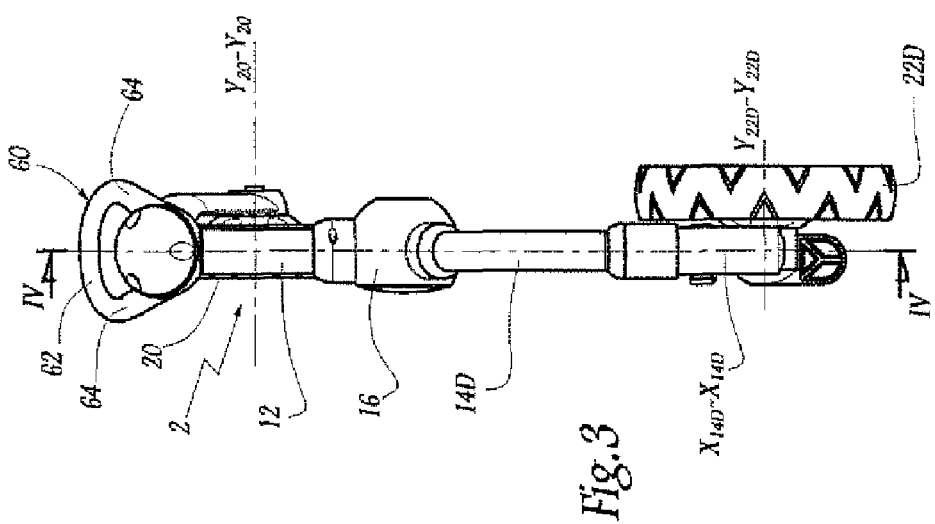
FIG. 3 is a view similar to FIG. 1, illustrating the stroller frame in a storage configuration.

For convenience, the rest of the description is oriented toward the stroller frame 2 when the latter is in its service configuration illustrated in FIGS. 1 and 2, so that the terms "upper" and "top" designate a direction directed away from the ground S and corresponding to the top portion of FIG. 1, whereas the terms "lower" and "bottom" designate an opposite direction. Similarly, the terms "front" and "rear" should be interpreted relative to the normal direction of advance of the stroller, that is to say the direction in which this stroller is normally pushed, so that the front corresponds to the right hand portion of FIG. 1 and the top portion of FIGS. 2 to 4. Similarly, the terms "left" and "right" are defined relative to the direction of advance of the stroller, so that they respectively designate the left-hand and right-hand portions of FIGS. 2 and 4.

The frame 2 comprises a non-articulated rigid framework which includes a single front arm 12, two left 14G and right 14D rear arms and a central section 16. The arms 12, 14G and 14D each have an essentially tubular shape extending lengthwise overall in the antero-posterior, or front to rear, direction of the frame 2. The front arm 12 is rectilinear over its entire length, whereas the left 14G and right 14D rear arms converge toward one another toward the front so that each of these arms consists of a rectilinear rear portion $14G_1$, $14D_1$, centered on a longitudinal axis $X_{14G}$-$X_{14G}$, $X_{14D}$-$X_{14D}$ and extended toward the front by a bent portion $14G_2$, $14D_2$ in the direction of the section 16. The left 14G and right 14D rear arms are advantageously symmetrical to one another relative to an antero-posterior, or front to rear, median vertical plane P of the frame 2, this plane passing through the central longitudinal axis $X_{12}$-$X_{12}$ of the front arm 12.

The central section 16 comprises a partially hollow rigid main body to which are joined the rear end of the front arm 12 and the respective front ends of the rear arms 14G and 14D by leading inward. In the example considered in the figures, the arm 12 is made of a single piece with the body of the section 16 whereas the rear arms 14G and 14D are added and fixed to this body, with an external capping fitted, particularly for esthetic purposes.

To push the stroller 1 on the ground S, the frame 2 is provided with three wheels bearing on the ground, namely a front wheel 20 and two rear wheels, respectively left 22G and right 22D, designed to rotate about respective rotation axes $Y_{20}$-$Y_{20}$, $Y_{22G}$-$Y_{22G}$, $Y_{22D}$-$Y_{22D}$. In practice, each of these wheels can have various embodiments, as much regarding its outer peripheral portion $20_1$, $22G_1$, $22D_1$ intended to roll on the ground, which may, for example, consist of a rubber sheath or a tubed tire, as with regard to its discoid central body $20_2$, $22G_2$, $22D_2$, possibly open-worked or spoked, the central geometrical axis of which corresponds to the rotation axis $Y_{20}$-$Y_{20}$, $Y_{22G}$-$Y_{22G}$, $Y_{22D}$-$Y_{22D}$.

Figure 5:
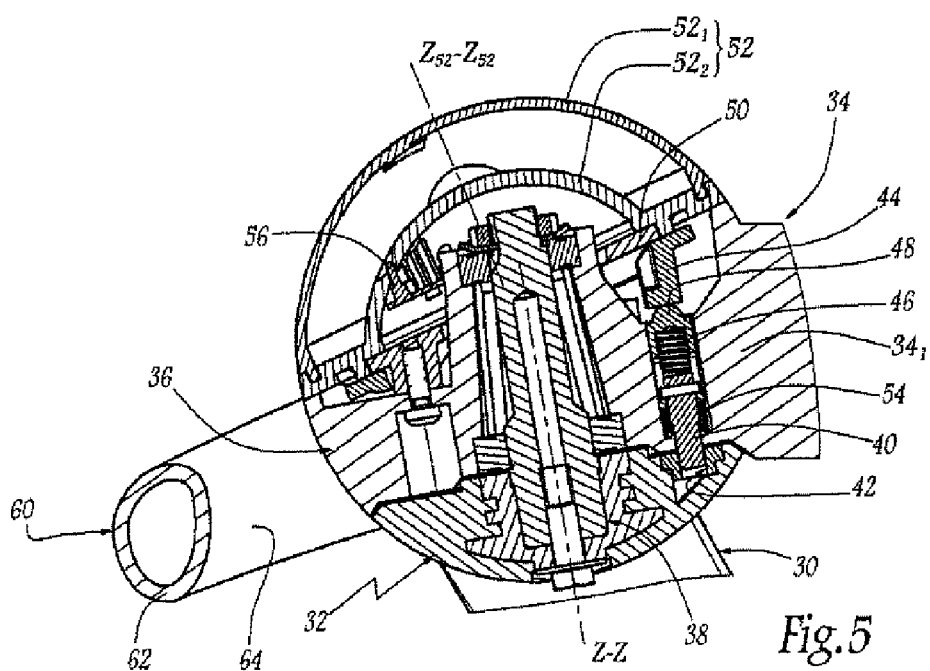
FIG. 5 is a larger scale view of the detail V of FIG. 4.
Figure 6:
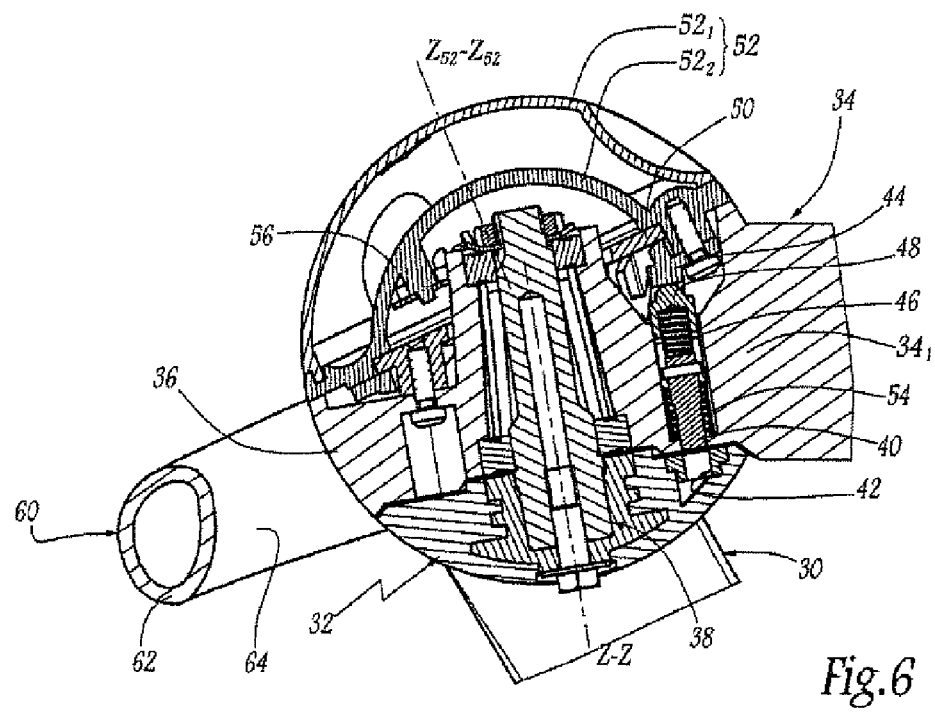
FIG. 6 is a view similar to FIG. 5, illustrating the front end of the stroller frame in an immobilized state compared to the free state illustrated in FIG. 5.

As can be clearly seen in FIGS. 1 and 4, and as represented in more detail in FIGS. 5 to 7, the front wheel 20 is connected to the front arm 12 by, in succession, a rigid leg 30 and a mechanical articulation assembly 32. More specifically, the wheel body $20_2$ is mounted to rotate about the axis $Y_{20}$-$Y_{20}$ on a hub formed by a longitudinal end $30_1$ of the leg 30, said leg extending lengthwise in a direction radial to this axis. The arm 12 is provided internally with a shaft 34 which extends over the entire length of the arm, being centered on its axis $X_{12}$-$X_{12}$. For mechanical strength reasons, the outer diameter of this shaft 34 is fitted to the inner diameter of the arm 12. The front end $34_1$ of the shaft 34 is prolonged forward, outside the arm 12, by an end fitting 36 supporting the articulation assembly 32. Here, the end fitting 36 is rigidly linked to the shaft end $34_1$, being of a single piece with this end, and is conformed in a hollow sphere truncated both on the side from which the leg 30 extends and on the opposite side. Inside this sphere formed by the end fitting 36, a pivot articulation 38 is arranged between this end fitting and the end $30_2$ of the leg 30, opposite the wheel 20: this articulation 38 allows free pivoting of the end $30_2$ relative to the end fitting 36 and therefore relative to the shaft 34 about an axis Z-Z that is substantially perpendicular to the axis $X_{12}$-$X_{12}$. In this way, in particular when the stroller frame 2 is rolling on the ground S, the leg 30 and, by that, the front wheel 20, can pivot about the axis Z-Z, the top edge of the end $30_2$ then sliding against the bottom face of the end fitting 36, whereas, in the longitudinal direction of the leg 30, said leg and the end fitting 36 are fixedly linked to one another.

The pivot articulation 38 can be neutralized inasmuch as it can be mechanically immobilized. In the exemplary embodiment illustrated in detail in FIGS. 5 and 6, this immobilization is obtained by a pin 40 that can be accommodated in a complementary recess 42 delimited at the end $30_2$ of the leg 30, in the top edge of this end: as long as the pin 40 is outside the recess 42, as in FIG. 6, the leg 30 and the end fitting 36 are free to pivot relative to one another about the axis Z-Z, whereas, when the pin 40 is inserted into the recess 42 as in FIG. 5, the leg 30 and the end fitting 36 are rigidly linked to one another, so that the rotation axis $Y_{20}$-$Y_{20}$ then extends orthoradially to the axis $X_{12}$-$X_{12}$, as in FIGS. 1 to 4.

The movement of the pin 40 is controlled by a push finger 44, with the interposition of an overtravel spring 46 partially housed in a bush 48 mounted to slide in the end fitting 36 in the direction of movement of the pin 40. Under the action of the spring 46, the push finger 44 is pressed, unlike the pin 40, against a plate 50 fixedly joined to the end fitting 36, in this case by screws, while extending overall in its truncation plane opposite the leg 30. The finger 44 is rigidly linked to a trim 52 mounted on the end fitting 36 so as to rotate about an axis $Z_{52}$-$Z_{52}$ both perpendicular to the plate 50 and passing through the center of the sphere formed by the end fitting 36.

By rotating the trim 52 about the axis $Z_{52}$, the user drives, over a corresponding travel, the finger 44 which, because of its variable thickness in a direction peripheral to this axis, acts on the immobilizing pin 40: in the configuration illustrated in FIG. 5, the position of the trim 52 about the axis $Z_{52}$-$Z_{52}$ is such that a significant thickness of the finger 44 is interposed between the plate 50 and the bush 48, whereas, in the configuration of FIG. 6, the position of the trim is such that a lesser thickness of the finger 44 is interposed, a spring 54 then returning the pin 40 in the direction opposite to the recess 42.

To facilitate handling of the trim 52, and for esthetic purposes, this trim has an external cap $52_1$, contained within the spherical jacket defined by the end fitting 36. Similarly, as can be clearly seen in FIGS. 5 and 6, it will be noted that the end $30_2$ of the leg 30 is conformed in a spherical cap contained within the abovementioned jacket, so that the assembly of this end $30_1$ of the end fitting 36 and of the trim 52 gives an overall ball shape, with a visual "signature" effect, specific to the stroller frame 2, as can be clearly seen in FIG. 7 in which the external cap $52_1$ is represented by faint lines to reveal the interior of the trim.

Advantageously, a light source is arranged between the plate and an open-work internal cap $52_2$ of the trim 52, so as to have a visual warning lamp. Detailed modalities for producing such a lamp are given in WO-A-2006/111656 to which the reader can refer.

Moreover, as can be clearly seen in FIGS. 1 to 7, the end fitting 36 is prolonged, forward, by a handle 60 rigidly linked to the end fitting, while being, for example, directly of a piece with the end fitting. Advantageously, this handle 60 is in the shape of a bow, the elongate main body 62 of which is situated on the front side of the end fitting 36, extending along the front end portion of the end fitting and in a direction that is overall peripheral to the end fitting while providing between them sufficient space for the user to be able to insert his fingers therein in order to grasp the body 62. At its longitudinal ends, the body 62 is rigidly linked to the lateral sides of the end fitting 36 by legs 64 converging toward one another in the direction of the end fitting 36.

At the back of the frame 2, the bodies $22G_2$ and $22D_2$ of the wheels 22G and 22D are respectively connected to the rectilinear parts $14G_1$ and $14D_1$ of the arms 14G and 14D according to arrangements described hereinbelow in detail for the right side of the stroller, it being understood that the arrangements of the left side can be deduced by symmetry relative to the plane P and incorporate components which, in the figures, notably FIG. 10, bear the same numeric references as the right side, but followed by the letter G instead of the letter D.

Figure 9:
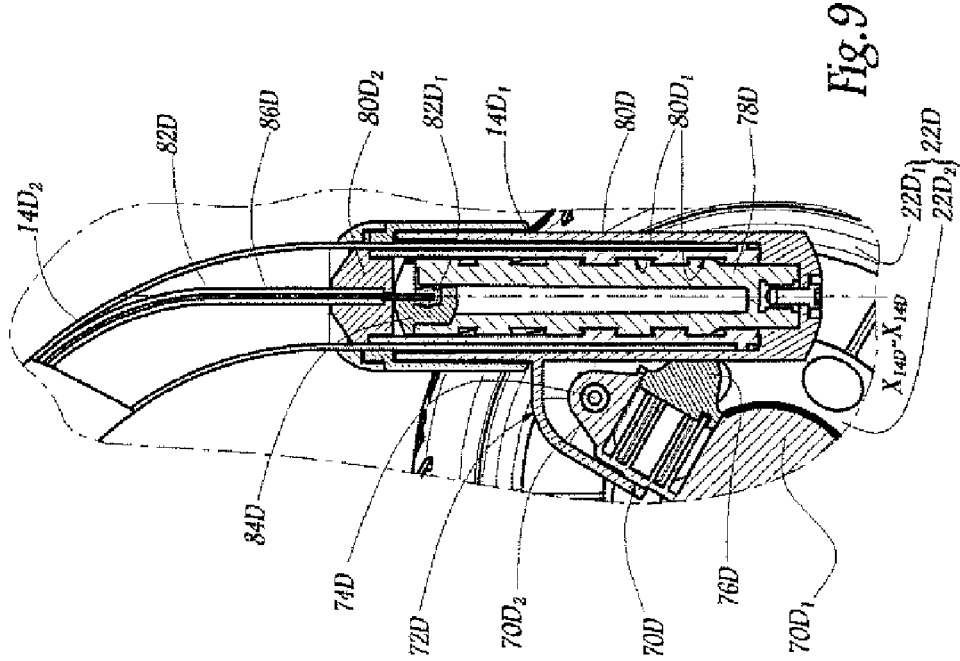
FIGS. 8 and 9 are respectively larger scale views of the details VIII and IX of FIGS. 2 and 4.
Figure 8:
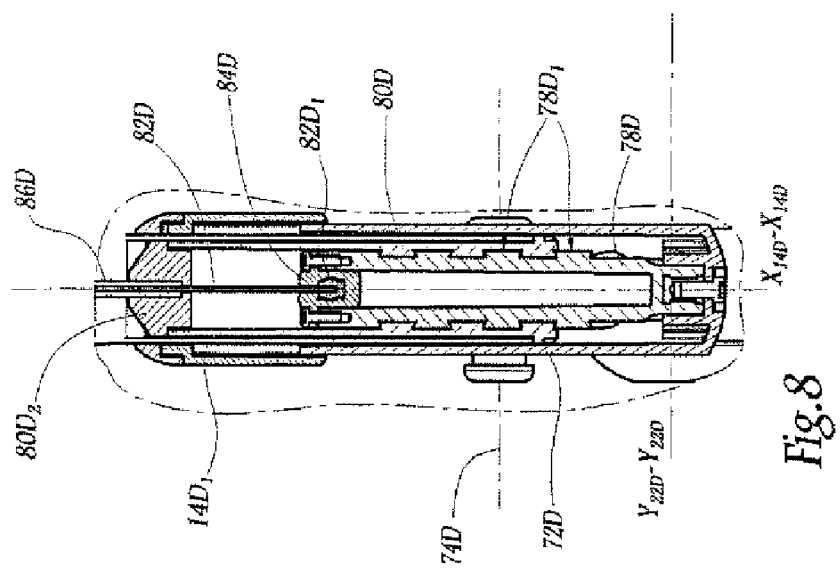

As represented in more detail in FIGS. 8 and 9, the body $22D_2$ of the right wheel 22D is mounted to rotate about the axis $Y_{22D}$-$Y_{22D}$ on a hub formed by a longitudinal end $70D_1$ of a leg 70D extending lengthwise in a direction radial to this axis. Its end $70D_2$ opposite to the wheel body $22D_2$ is, in the longitudinal direction of the leg, fixedly linked to a sleeve 72D which both coaxially surrounds the rectilinear part $14D_1$ of the arm 14D and extends partially protruding behind this part. Advantageously, the link between the leg 70D and the sleeve 720 is articulated about a tilting axis 74D parallel to the rotation axis $Y_{22D}$-$Y_{22D}$, thus enabling the leg 70D to oscillate about this axis relative to the sleeve, with interposition of a visco-elastic pad 76D for damping purposes. The rear wheel 22D is thus suspended relative to the framework by the oscillating leg 700, which makes the rolling of the stroller very comfortable for the child being transported, even if the surface condition of the ground S is poor. This suspended structure of the rear wheels 22G and 22D also makes it possible to avoid the need for a rigid axle directly linking these two rear wheels through the space between the rear of the arms 14G and 14D. The adult pushing the stroller can then walk comfortably, without the risk of banging his leg when striding.

The sleeve 72D is rigidly linked to a link block 78D arranged coaxially inside both the sleeve 72D and the rectilinear part $14D_1$. In the exemplary embodiment considered here, the sleeve 72D and the link block 78D are linked to one another at their rear end. The link block 78D is mounted to move inside a tubular slide 80D interposed coaxially between the link block and the rectilinear part $14D_1$. The link block 78D is provided with helical external ribs $78D_1$ which wind around the longitudinal axis of the link block, whereas the internal face of the slide 80D delimits complementary helical grooves $80D_1$ in which the ribs are received. This way, the link block 78D is able to move inside the slide 80D by a helical movement centered on the axis $X_{14D}$-$X_{14D}$.

The driving of the link block 78D relative to the slide 80D is controlled by a pulling and pushing cord 82D. The rear end of this cord 82D is provided with a small end fitting $82D_1$ which is essentially spherical and thus able to rotate freely on itself with the rest of the cord 82D inside a head 84D that is both fixed to the front end of the link block 78D and fixedly linked to the cord 82D in the longitudinal direction of this cord.

The cord 82D extends toward the front inside the arm 14D, the running part of this cord being received in a sheath 86D fixedly wedged inside the arm. In particular, the rear end of this sheath is wedged in a fixed front end fitting $80D_2$ of the slide 80D, which is passed through from side to side by the cord 82D.

Figure 11:
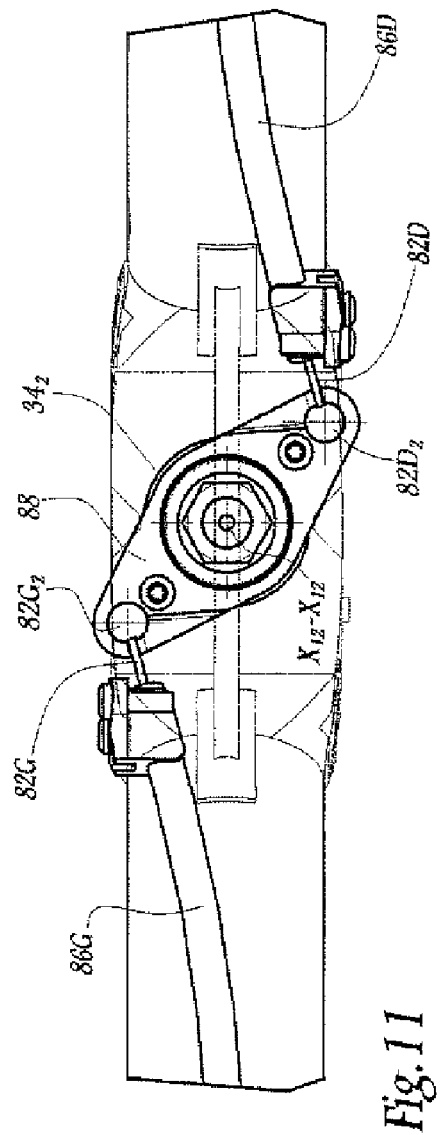
FIG. 11 is a diagrammatic view in elevation according to the arrow XII of FIG. 2, of a portion of the frame.
Figure 12:
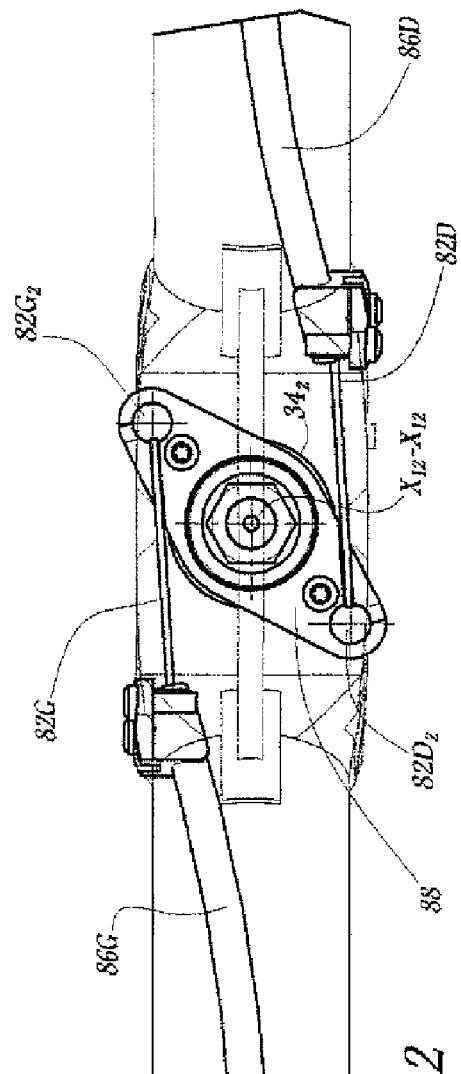
FIG. 12 is a view similar to FIG. 11, illustrating the portion of the frame observed when the latter is in its configuration of FIGS. 3 and 4.
Figure 13:
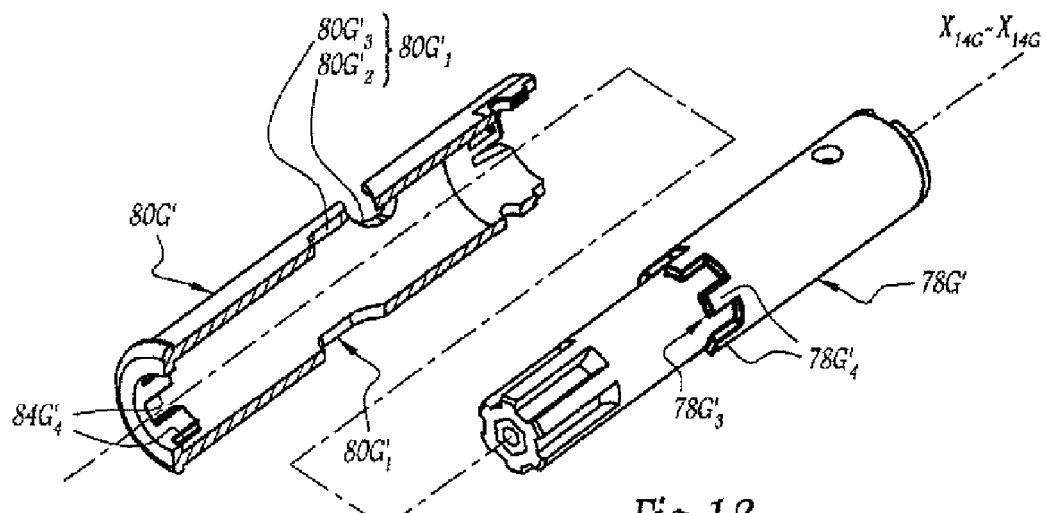
FIG. 13 is an exploded view in perspective and partially in cross section, illustrating a first variant embodiment according to the invention.

As represented in more detail in FIGS. 11 to 13, the respective front ends $82D_2$ and $82G_2$ of the cords 82D and 82G are fixed to one and the same control wheel 88 rigidly assembled at the rear end $34_2$ of the shaft 34. More specifically, the control wheel 88 is centered on the axis $X_{12}$-$X_{12}$, whereas the rear ends $82D_2$ and $82G_2$ of the cords 82D and 82G are fixed in areas of the control wheel 88 that are diametrically opposite relative to the axis $X_{12}$-$X_{12}$.

The handle 60 controls the movement of the wheels 20, 22G and 22D relative to the framework 2. More specifically, if we consider that the wheels are initially in their service position of FIGS. 1 and 2, that is to say, in an extended position relative to the framework, enabling them to roll on the ground S, with their rotation axis $Y_{20}$-$Y_{20}$, $Y_{22G}$-$Y_{22G}$ and $Y_{22}$-$Y_{22D}$ all perpendicular to the plane P, driving the shaft 34 to rotate on itself about the axis $X_{12}$-$X_{12}$ by virtue of the corresponding manipulation of the handle 60 by a user gripping the body 62, as indicated by the arrow R in FIGS. 1 and 2, and this over an angular travel of 90° C., results in the combined retraction of the three wheels as explained hereinbelow. In other words, to do this, the user grasps the handle 60 and applies a driving torque of a quarter turn about the axis $X_{12}$-$X_{12}$.

At the front of the frame 2, rotating the front end $34_1$ of the shaft 34 results in a corresponding rotation, over an angular travel of 90°, of the end fitting 36 and, through that, of the leg 30 and of the wheel body $20_2$. The wheel 20 then switches from its position of FIGS. 1 and 2 to its position of FIGS. 3 and 4, in which its rotation axis $Y_{20}$-$Y_{20}$ extends parallel to the plane P, it being noted that, during this retraction of the wheel, the pivot articulation 38 may be immobilized by virtue of the immobilizing pin 40 previously inserted into the recess 42, as explained above.

At the rear of the stroller frame 2, rotating the rear end $34_2$ of the shaft 34 results in a 90° rotation about the axis $X_{12}$-$X_{12}$ of the control wheel 88, which then switches from its position of FIG. 11 to that of FIG. 12. The cords 82D and 82G are then pulled over an identical travel, causing the link blocks 78D and 78G to be pulled forward inside their slide 80D and 80G, fixed relative to the arm 14D and 14G. The link blocks 78D and 78G then describe respective helical travels, combining a forward translation movement and a 90° rotation respectively about axes $X_{14D}$-$X_{14D}$ and $X_{14G}$-$X_{14G}$. The result of this is that the rear wheels 22D and 22G change from their position of FIGS. 1 and 2 to their retracted position of FIGS. 3 and 4, in which the rotation axes $Y_{22D}$-$Y_{22D}$ and $Y_{22G}$-$Y_{22G}$ extend parallel to the plane P, it being noted that the rear wheels remain symmetrical to one another relative to the plane P throughout their retraction.

The bodies $22D_2$ and $22G_2$ of the rear wheels 22D and 22G then extend overall in one and the same plane perpendicular to the plane P, allowing the frame 2 to roll on the ground S by rotation of the two rear wheels about their axis $Y_{22D}$-$Y_{22D}$, $Y_{22G}$-$Y_{22G}$. If necessary, the stroller frame 2 is then locked in this configuration by an ad hoc immobilizing means, such as a locking pin. The stroller frame 2 can then be moved stably in the manner of a baggage trolley with its front arm 12 and the handle 60 directed upward, so that this handle can be grasped by the user to move the stroller frame in order to stow it vertically, by rolling it into a closet for example. In a particularly practical manner, it will be understood that, when the user grasps the handle 60 when the wheels are extended and he operates this handle to retract the wheels as described above, the user concomitantly uses this handle to straighten the frame of the stroller vertically so as to automatically bring the frame to its stable position bearing on its rear wheels.

Furthermore, because of the helical travel of the retraction movement of the rear wheels 22G and 22D, it will be understood that the distance Δ between the rotation axis $Y_{20}$-$Y_{20}$ of the front wheel 20 and the rotation axis $Y_{22D}$-$Y_{22D}$, $Y_{22G}$-$Y_{22G}$ of each rear wheel 22D, 22G varies by the anteroposterior dimension of the part of the link blocks 78D and 78G retracted inside their corresponding slide 80D, 80G, which may in practice be as much as 40 mm. Consequently, the overall antero-posterior dimension of the stroller frame 2 is reduced by Δ when the wheels are retracted.

Obviously, the control by the handle 60 of the 90° rotation of the shaft 34 in the reverse direction to that considered above, when the wheels 20, 22D and 20G are initially retracted, results, through a transmission of reverse movements, in the concomitant extension of these three wheels.

Optionally, a longitudinal part of each cord 82D, 82G is advantageously made of a metal alloy with shape memory, such as the alloy based on nickel and titanium, marketed by the company NIMESIS (France), so that this cord part is able to be twisted, or even folded without damage, by transverse elastic deformation, when the user controls the retraction or the extension of the wheels when said retraction is inadvertently prevented, for example, following the wedging of a wheel against a wall. In this way, damage to the rest of the cord is avoided, which could have damaging consequences for the correct transmission of the pulling and pushing forces that must normally be provided by this cord.

Figure 14:
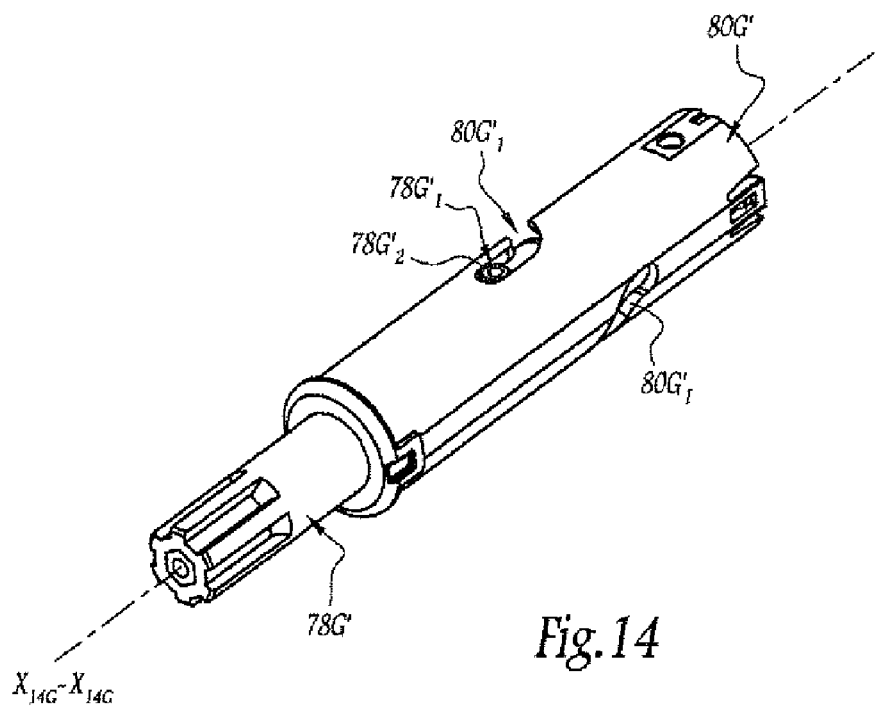
FIG. 14 is a perspective view of the components represented in FIG. 13, in an assembled configuration.

FIGS. 13 and 14 show a variant embodiment of the link blocks 78D and 78G and the slides 80G and 80D of the stroller frame 2. The corresponding arrangements of this variant are described in detail hereinbelow for the left side of the stroller frame 2, it being understood that the arrangements of the right side can be deduced by symmetry relative to the plane P.

Figure 15:
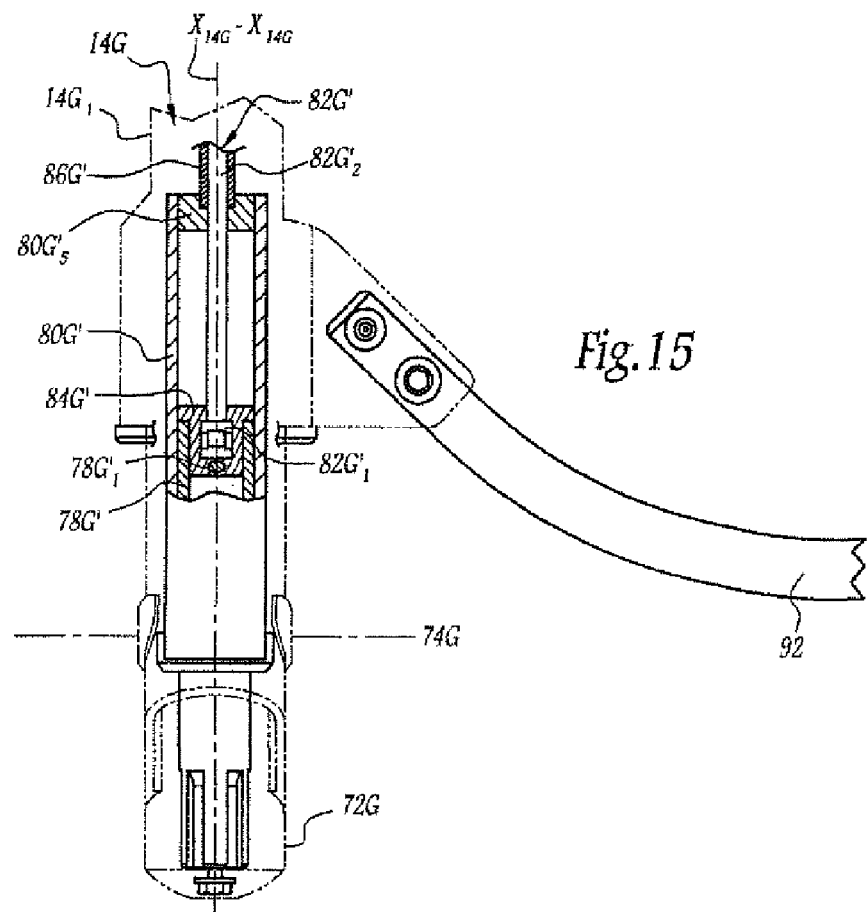
FIG. 15 is a diagrammatic view partially in cross section, roughly similar to FIG. 8, illustrating a second variant embodiment according to the invention, which is also combined with the variant of FIGS. 13 and 14.

Thus, according to this variant of FIGS. 13 and 14, the link block 78G and the slide 80G are replaced respectively by a link block 78G' and a slide 80G'. The arrangement, within the stroller frame 2, and the function of this link block 78G' and of this slide 80G' are similar to the arrangement and the function of the link block 78G and of the slide 80G: in particular, the link block 78G' is arranged coaxially inside the sleeve 72G as diagrammatically represented in FIG. 15, while being rigidly linked to this sleeve 72G at their rear end, whereas the slide 80G' is fixedly arranged inside the rectilinear part $14G_1$ of the arm 14G, also as shown in FIG. 15.

The link block 78G' and the slide 80G' are mainly distinguished from the link block 78G and from the slide 80G by arrangements relating to the guiding of the link block 78G' inside the slide 80G' by an overall helical movement centered on the axis $X_{14G}$-$X_{14G}$ of the arm 14G. In practice, by replacing the helical ribs and grooves used in the embodiment of FIGS. 1 to 12, the tubular wall of the slide 80G' is passed through, from side to side, by two diametrically opposite slots $80G'_1$, symmetrically relative to the axis $X_{14G}$-$X_{14G}$. Each groove $80G'_1$ includes, along its length, a helical front end part $80G'_2$, centered on the axis $X_{14G}$-$X_{14G}$, and a rectilinear rear end part $80G'_3$, parallel to this axis. When the link block 78G' is assembled inside the slide 80G', each of these grooves $80G'_1$ receives one of the longitudinal ends of a transfixing locking pin $78G'_1$ rigidly linked to the link block 78G', extending perpendicularly to the axis $X_{14G}$-$X_{14G}$, one of the longitudinal ends of this locking pin $78G'_1$ being visible in FIG. 14, with the reference $78G'_2$. The width of each groove $80G'_1$ is fitted to that of the ends $78G'_2$ of the locking pin $78G'_1$, so that, during the relative movement between the link block 78G' and the slide 80G', the corresponding movement successively consists of a first helical sub-movement, when the ends $78G'_2$ of the locking pin $78G'_1$ pass through the helical part $80G'_2$ of the grooves $80G'_1$ and a second rectilinear sub-movement when the abovementioned ends pass through the rectilinear part $80G'_3$ of the grooves.

Thus, by cooperation between the locking pin $78G'_1$ and the helical parts $80G'_2$ of the grooves $80G'_1$, the antero-posterior guidance between the link block 78G' and the slide 80G' by a helical movement, substantially as for the embodiment of FIGS. 1 to 12, is restored. Furthermore, by cooperation between the locking pin $78G'_1$ and the rectilinear parts $80G'_3$ of the grooves $80G'_1$, the relative angular position between the link block 78G' and the slide 80G' is fixed: this configuration corresponds to the extreme rear placement of the link block 78G' relative to the slide 80G', as shown in FIG. 14, that is to say to the configuration in which the rear wheels 22G and 22D are extended. The mechanical strength of these wheels in the extended configuration is thus enhanced.

Advantageously, this mechanical strength is reinforced by the presence, on the outer surface of the link block 78G', of a crenellated ring $78G'_3$ comprising a plurality of axial ribs $78G'_4$ which are distributed on the outer periphery of the link block and that are conformed to be received in a complementary manner in axial grooves $80G'_4$ hollowed out in the internal face of the slide 80G', in this case at the rear end of this slide. By appropriate dimensioning, these ribs $78G'_4$ and these grooves $80G'_4$ are progressively axially geared to one another when the locking pin $78G'_1$ passes through the rectilinear parts $80G'_3$ of the grooves $80G'_1$, from the front end of these rectilinear parts to their rear end. The forces then applied to an ad hoc locking means, immobilizing the stroller frame 2 with its wheels in extended configuration, thus remain limited and supported by this immobilizing means, without damage.

By way of optional advantageous arrangement, not represented in detail in the figures, the helical parts $80G'_2$ of the grooves $80G'_1$ are prolonged forward by rectilinear groove parts that do not need to be as long as the rear rectilinear parts $80G'_3$ and that make it possible to stabilize the relative angular position between the link block 78G' and the slide 80G' when the corresponding rear wheel 22G is retracted, by being folded back against the framework 10 as explained above. The resistance to the forces then applied to the duly folded stroller frame 2 is enhanced.

Figure 16:
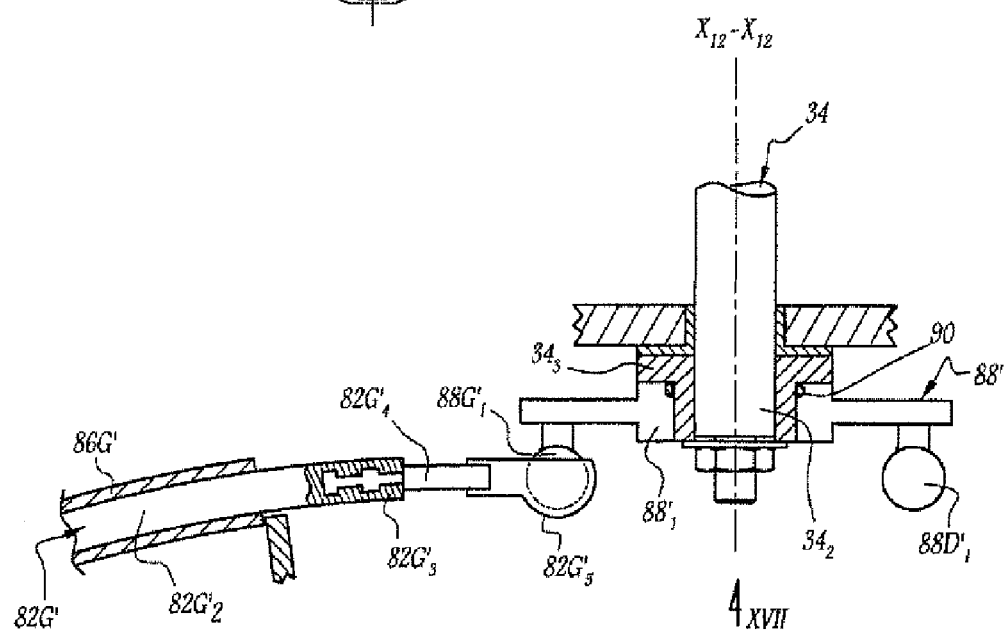
FIG. 16 is a diagrammatic cross section, in a plane parallel to that of the partial cross section of FIG. 15, illustrating a third variant embodiment according to the invention, relating to the portion of the frame involved in FIGS. 11 and 12, this third variant also being combined with the variant shown in FIG. 15.
Figure 17:
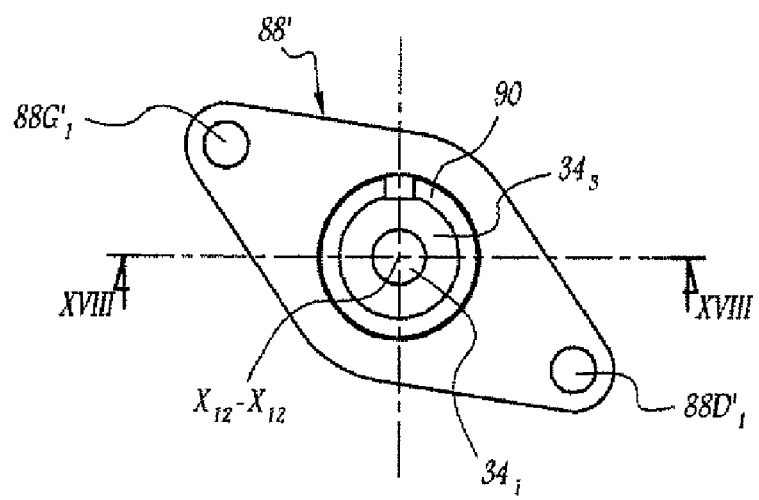
FIG. 17 is a view in elevation according to the arrow XVII of FIG. 16, showing only certain components of FIG. 16.

FIGS. 15 and 16 represent another variant embodiment of the stroller frame 2 which, apart from what has just been described with regard to FIGS. 13 and 14, is distinguished from the embodiment described with regard to FIGS. 1 to 12 essentially by the structure, detailed hereinbelow, of the driving means of the link blocks 78D and 78G or 78D' and 78G' relative to their corresponding rear arm 14D and 14G, and, incidentally, by slight contour modifications to certain components associated with these rear arms, without, however, these slight modifications inducing significant structural and functional differences.

Thus, rather than drive each link block 78D, 78G by the pulling and pushing cord 82D or 82G as described with regard to FIGS. 8 and 9, the variant of FIGS. 15 and 16 provides for the use of an actuator in the form of a semi-rigid rod 82D' or 82G', it being noted that only the rod 82G' associated with the left rear arm 14G can be seen in FIGS. 15 and 16. Moreover, the corresponding arrangements for the left side of the stroller frame 2 are described in more detail hereinbelow, it being understood that the arrangements of the right side can be deduced by symmetry relative to the plane P.

Thus, with regard to FIGS. 15 and 16, the semi-rigid rod 82G' links in movement the link block 78G' and the rear end $34_2$ of the shaft 34. To this end, the rear end $82G'_1$ of this rod is fixedly joined to a front end head 84G' of the link block 78G', in this case by having a bulbous shape, received and retained in a complementary recess delimited inside the head 84G'. Advantageously, the head 84G' is fixed relative to the link block 78G' by the transfixing locking pin $78G'_1$.

The running part $82G'_2$ of the semi-rigid rod 82G' is received in a sheath 86G' that is functionally similar to the sheath 86G: this sheath 86G' is thus fixedly incorporated inside the arm 14G with, in particular, its rear end wedged in a fixed front end fitting $80G'_5$ of the slide 80G' whereas this end fitting is passed through from side to side by the rod 82G'. The flexibility of the running part of the rod $82G'_2$ is exploited, on the one hand, to adapt the overall longitudinal profile of the rod 82G' to the bent part $14G_2$ of the arm 14G, by bending this profile, and on the other hand, to support, without damage, a slight twist of the rod 82G', associated with the helical movement of the link block 78G'. The result of this last aspect is that the mechanical link between the rod 82G' and the link block 78G' does not have to be as sophisticated as that between the cord 82G and the link block 78G, in particular without the need for a small spherical end piece to be provided at the rear end of this cord.

As an example, to obtain sufficient flexibility of the running part of the rod $82G'_2$, while guaranteeing sufficient force transmission by this running part of the rod, in a longitudinal direction of the latter, this running part $82G'_2$ has a cross-shaped transversal section and is made of a synthetic material such as nylon.

The front end $82G'_3$ of the rod 82G' is rigidly provided with an insert $82G'_4$, for example overmolded with the front end of the rod, as represented in FIG. 16. At its end opposite to the rod 82G', this insert $82G'_4$ is fixed to a control wheel 88', arranged at the rear end $34_2$ of the shaft 34 and functionally similar to the control wheel 88 shown in FIGS. 11 and 12. In the exemplary embodiment considered in FIG. 16, the control wheel 88', centered on the axis $X_{12}$-$X_{12}$, is provided, in diametrically opposite areas relative to this axis, with two protruding spheres $88G'_1$ and $88D'_1$, designed to be respectively received, in the manner of a ball joint, in a complementary shell $82G'_5$ rigidly borne by the insert $82G'_4$ of the rear end of the corresponding left rod 82G' or right rod 82D'.

Thus, as for the control wheel 88, the rotation of the control wheel 88' by the shaft 34, over a 90° travel centered on the axis $X_{12}$-$X_{12}$, results, depending on the direction of this rotation, in the semi-rigid rods 82G' and 82D' being pulled forward or pushed backward in order to actuate the movement of the link blocks 78G' and 78D' inside their slide 80G' and 80D'. By comparison with the cords 82G and 82D, the actuating rods 82G' and 82D' have the advantage of being standard mechanical components that are widely available on the market, which support, without damage, the transmission of the forces needed to extend and retract the rear wheels 22G and 22D.

FIGS. 16 to 19 show yet another variant embodiment of the stroller frame 2, which specifically relates to the mechanical link between the rear end $34_2$ of the shaft 34 and the control wheel 88 or 88', this variant being applied here to the control wheel 88' and thus detailed hereinbelow in this context. Rather than rigidly joining this control wheel to the rear end $34_2$ of the shaft 34, as in the embodiment considered in FIGS. 1 to 12, a horseshoe-type spring 90 is interposed between them in order to limit the intensity of the torque transmitted between the control wheel 88' and the shaft end $34_2$.

Figures 18, 19:
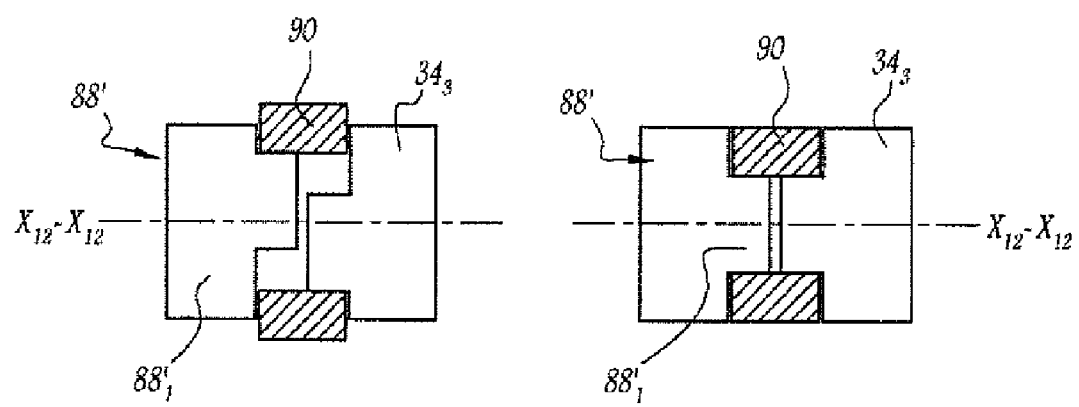
FIG. 18 is a diagrammatic cross section along the line of FIG. 17.
FIG. 19 is a view similar to FIG. 18, illustrating the components of FIG. 17 in an operating configuration that is different from that shown in FIG. 18.

More specifically, this spring 90 is conformed to grip, in a manner centered on the axis $X_{12}$-$X_{12}$, a bush $34_3$ that is rigidly linked to the shaft end $34_2$ and to the central region $88'_1$ of the control wheel 88': the stiffness of the spring 90 is engineered to immobilize the relative rotation of the bush $34_3$ and the region of the control wheel $88'_1$ about the axis $X_{12}$-$X_{12}$, as long as the intensity of the torque transmitted between these two pieces is below a predetermined limit value, as represented in FIG. 18. In this way, if a relative torque, about the axis $X_{12}$-$X_{12}$, between the shaft 34 and the control wheel 88 is applied with an intensity above the abovementioned limit value, the spring 90 is deformed elastically to allow a relative free rotation of the shaft 34 on itself and of the control wheel 88' on itself, as represented in FIG. 19.

In this way, when the user retracts or extends the wheels of the stroller frame 2 by the handle 60, when this retraction or this extension is inadvertently prevented at one of the rear wheels 22G and 22D, for example following the jamming of this wheel against a wall, the kinematic resistance of this wheel induces, on the control wheel 88', a torque differential about the axis $X_{12}$-$X_{12}$ relative to the shaft 34: if the intensity of this torque differential is above the abovementioned limit value, the user continues rotating the shaft 34 without the corresponding force being transmitted to the control wheel 88' and to the rods 82G' and 82D' by virtue of the spring 90, thus avoiding damage to this control wheel and these rods.

Various arrangements and variants of the stroller frame 2 described hitherto can also be considered. A few examples are given below:
- each wheel 20, 22D and 22G or at least one of these wheels can be equipped with a rotation immobilizing means in order to immobilize the stroller frame 2 on the ground S for the purpose of parking for a certain time;
- the front wheel 20 and/or each of the rear wheels 22D and 22G can be replaced by a twinned pair of wheels, or even a twinned wheel train;
- moreover, to link the front wheel 20 to the arm 12, the leg 30 may be replaced by a fork, the two branches of which extend either side of the wheel body $20_2$;
- optionally, the rotation of the shaft 34 by the handle 60 when retracting or extending the wheels can be transmitted, by appropriate arrangements, to the structure 4 of the stroller, in particular in order to respectively assist in the folding and the opening of this structure relative to the frame; and/or
- also optionally, the structure of the stroller frame 2 can be reinforced by a cross-member rigidly linking the rear arms 14D and 14G, in particular in their rectilinear part $14D_1$ and $14G_1$; for example, the opposite ends of such a cross-member are fixedly joined to the respective fixed caps that externally clamp the arm parts $14D_1$ and $14G_1$, as partially represented in FIG. 15, in which the abovementioned cross-member is referenced 92.

The invention claimed is:

1. A frame for a stroller for transporting a child, comprising:
    two rear arms and a single front arm which are fixedly joined to one another, the two rear arms being spaced on opposite sides of a front to rear median vertical plane (P) of the frame;
    at least one wheel adjustably mounted to each of the two rear arms and the front arm so as to be movable between a first extended service position wherein an axis of rotation of each wheel extends transversely with respect to the median vertical plane (P) of the frame and a second compact storage position wherein the axis of rotation of the wheels extends parallel with respect to the median vertical plane (P) of the frame;
    movement means connected to the front arm for moving the at least one front wheel relative to the front arm between the first and second positions, the movement means being kinematically connected to second movement means connected to each of the at least one wheels mounted to the two rear arms for simultaneously moving the rear wheels between the first and second positions and wherein a distance between the rear wheels and the at least one front wheel being smaller when in the second position than when in the first position, and
    the movement means including a driving handle mounted at a front end of the front arm.

2. The frame of claim 1, wherein, when the rear wheels are in their second retracted position, they extend in a common plane perpendicular to the median vertical plane (P) of the frame and are able to roll on a ground surface along the common plane.

3. The frame as claimed in claim 1, wherein the movement means includes a main shaft which is supported by the front arm so as to rotate on the front arm and a front end of which is kinematically linked, both to the handle and to a hub of the at least one front wheel, and wherein a rear end of the main shaft is kinematically linked to a hub of each rear wheel.

4. The frame of claim 3, wherein the handle is formed as a single rigid piece with the front end of the main shaft.

5. The frame of claim 3, wherein the hub of the at least one front wheel is fixedly linked to a leg member, connected to the front end of the main shaft by a mechanical articulation assembly which includes both a pivot articulation defining an axis which extends transverse to the main shaft, around which the leg member and the main shaft pivot freely relative to one another, and immobilizing means for locking the leg member relative to the shaft so that the rotation axis of the at least one front wheel extends orthoradially to the main shaft.

6. The frame of claim 5, wherein the articulation assembly is supported by an end fitting rigidly connected to the front end of the main shaft, the handle having a shape of a bow which extends along a front peripheral portion of the end fitting so that a space for receiving fingers of a hand of a user is formed.

7. The frame of claim 5, wherein the immobilizing means are controlled by a trim that is movable relative to the front end of the main shaft, the trim covering the pivot articulation.

8. The frame of claim 3, wherein the second movement means includes, for each rear wheel, both a link block fixedly linked to a hub of the rear wheel and movably mounted in a slide which is joined to a corresponding rear arm and which guides the link block in a helical movement, and kinematic pulling and pushing means which link the link block and the rear end of the main shaft.

9. The frame of claim 8, wherein, for each rear wheel, the slide includes at least one groove including a helical front portion and a rectilinear rear portion for receiving a complementary element which is joined to the link block to guide the link block within the at least one groove.

10. The frame of claim 9, wherein, for each rear wheel, the link block and the slide respective include axially ribbed and grooved portions, which are shaped so as to cooperate with one another when the complementary element joined to the link block is received in the rectilinear rear portion of the at least one groove.

11. The frame of claim 8, wherein the kinematic pulling and pushing means consist, for each rear wheel, of a pulling and pushing cord connecting the link block and the rear end of the main shaft.

12. The frame of claim 11, wherein at least a portion of each pulling and pushing cord consists of a metal alloy with shape memory.

13. The frame of claim 11, wherein the second movement means includes a control wheel which is rigidly and coaxially linked to the rear end of the main shaft and to which are fixed, in a diametrically opposite manner, respective rear ends of the pulling and pushing cords.

14. The frame of claim 13, wherein a torque limiting means is interposed between the control wheel and the rear end of the main shaft.

15. The frame of claim 14 wherein the torque limiting means is a horseshoe-type spring.

16. The frame of claim 8 wherein the kinematic pulling and pushing means includes, for each rear wheel, a semi-rigid actuation rod conformed to transmit pulling and pushing forces between the link block and the rear end of the main shaft in the longitudinal direction of the rod, while being elastically deformable by bending.

17. The frame of claim 16, wherein the second movement means includes a control wheel which is rigidly and coaxially linked to the rear end of the main shaft and to which are fixed, in a diametrically opposite manner, respective rear ends of the actuating rods.

18. The frame of claim 17, wherein a torque limiting means is interposed between the control wheel and the rear end of the main shaft.

19. The frame of claim 18 wherein the torque limiting means is a horseshoe-type spring.

20. A stroller for transporting a child, the stroller comprising:
a frame including two rear arms and a single front arm which are fixedly joined to one another, the two rear arms being spaced from one another on opposite sides of a front to rear median vertical plane (P) of the frame;
at least one wheel adjustably mounted to each of the two rear arms and the front arm so as to be movable between a first extended service position wherein an axis of rotation of each wheel extends transversely with respect to the median vertical plane (P) of the frame and a second compact storage position wherein the axis of rotation of the wheels extends parallel with respect to the median vertical plane (P) of the frame;
movement means connected to the front arm for moving the at least one front wheel relative to the front arm between the first and second positions, the movement means being kinematically connected to second movement means connected to each of the at least one wheels mounted to the two rear arms for simultaneously moving the rear wheels between the first and second positions and wherein a distance between the rear wheels and the at least one front wheel being smaller when in the second position than when in the first position,
the movement means including a driving handle mounted at a front end of the front arm;
a support for a child; and
mounting components for mounting the support to the frame.

* * * * *